United States Patent [19]

Gale

[11] Patent Number: 5,183,232

[45] Date of Patent: Feb. 2, 1993

[54] INTERLOCKING STRAIN RELIEF SHELF BRACKET

[76] Inventor: John A. Gale, 3959 Colorado Ave. S., St. Louis Park, Minn. 55416

[21] Appl. No.: 828,422

[22] Filed: Jan. 31, 1992

[51] Int. Cl.⁵ .............................................. A47K 1/00
[52] U.S. Cl. .................................. 248/220.2; 52/657
[58] Field of Search ............... 248/220.2, 220.1, 205.1, 248/200, 235, 250; 403/174, 178, 175, 205, 403, 191; 52/657

[56] References Cited

U.S. PATENT DOCUMENTS

| | | | |
|---|---|---|---|
| 1,263,249 | 4/1918 | Hoppes | 403/174 |
| 1,672,502 | 6/1928 | Roth . | |
| 1,915,215 | 6/1933 | Carpenter | 403/403 X |
| 2,624,083 | 1/1953 | Butler . | |
| 2,994,415 | 8/1961 | Halle . | |
| 3,194,527 | 7/1965 | Gruss . | |
| 3,386,590 | 6/1968 | Gretz . | |
| 3,836,009 | 9/1974 | Horowitz et al. . | |
| 4,200,406 | 4/1980 | Fuss . | |
| 4,236,642 | 12/1980 | Klein | 403/175 X |
| 4,298,291 | 11/1981 | Ward, Jr. . | |
| 4,299,509 | 11/1981 | Meickl | 403/174 X |
| 4,322,051 | 3/1982 | Shepard . | |
| 4,379,651 | 4/1983 | Nagashima . | |
| 4,421,423 | 12/1983 | Lederrey . | |
| 4,805,860 | 2/1989 | Holmstrom . | |
| 4,812,075 | 3/1989 | Lavin, Sr. | 403/205 X |
| 4,969,568 | 11/1990 | Yoshida . | |

*Primary Examiner*—Ramon O. Ramirez
*Attorney, Agent, or Firm*—Haugen and Nikolai

[57] ABSTRACT

An improved interlocking shelf bracket which includes a body member of generally "L"-shaped configuration with first and second legs extending from a common apex. The first leg comprises a planar surface having a flange member extending therefrom, and with the flange member including an inverted "U"-shaped tubular receiving channel. The second leg is provided with a flange in the form of a tabular projection to be received within the channel. Means in the form of obliquely arranged slots are provided along inter-engaging surfaces of the bracket member in order to accommodate conventional fasteners and to interlock the mating brackets together, one to another. The obliquely arranged fastener receiving slots provide additional rigidity and stability to the overall assembly.

5 Claims, 3 Drawing Sheets

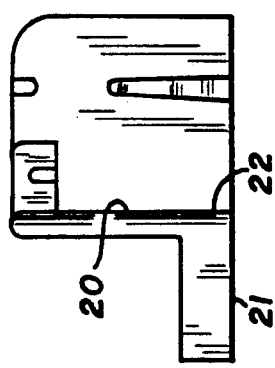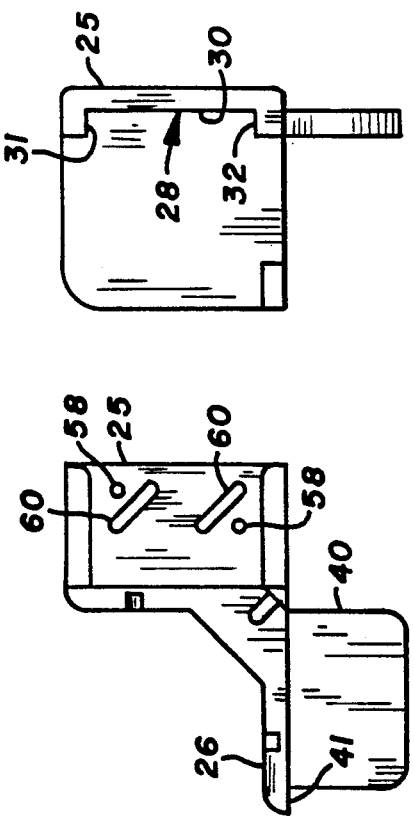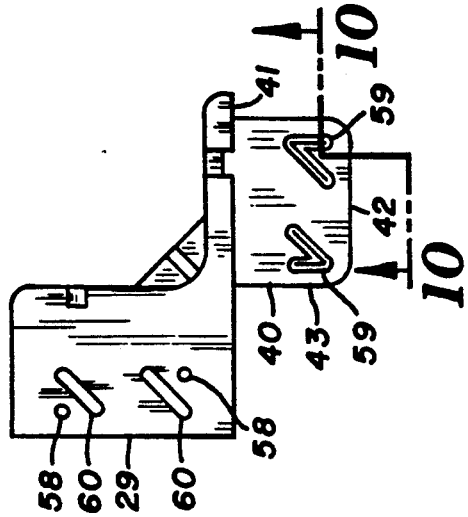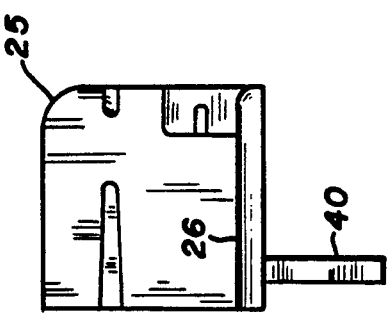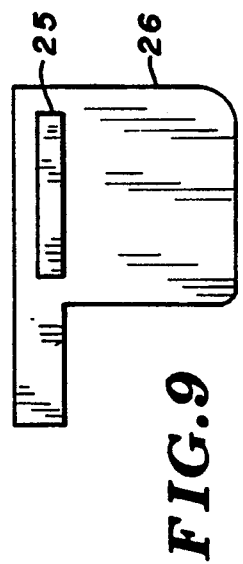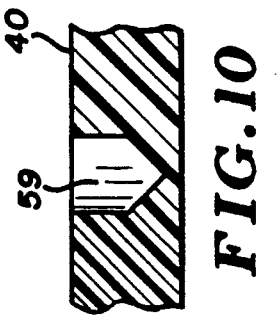

INTERLOCKING STRAIN RELIEF SHELF BRACKET

BACKGROUND OF THE INVENTION

The present invention relates generally to an improved interlocking shelf bracket, and more particularly to a mating pair of brackets of simple and durable design which may be readily installed in place, and efficiently utilized with conventional fastener devices for securing pieces of lumber and/or shelving together, even with two or more standard thickness dimensions being employed. The improved interlocking shelf bracket of the present invention is designed so as to distribute load stresses which are created and/or established during normal use. The devices of the present invention create a highly effective system employing conventional fasteners to form an array of individual shelving members arranged in a wide variety of preselected dispositions.

In the past, a substantial number of shelf bracket devices have been proposed and developed and which provide a means for attaching two or more structural members (normally standard lumber) together to form a desired shelving arrangement. While these devices have been generally useful and widely accepted, their use was frequently limited to accommodate special fasteners, or was limited to use with lumber of one standard dimension. Furthermore, these devices may have been partially or substantially completely ineffective for distributing stresses throughout other parts of the system when stresses were created by subsequent use and loading. Also, certain prior designs have been complex, cumbersome, and hence did not lend themselves to simple or readily facilitated installation with conventional fasteners. The improved shelf and/or coupling brackets of the present invention are designed to be used with mating brackets and employ conventional fasteners, including screws and nails. Thus the present invention is adapted for use by a wide variety of consumers.

SUMMARY OF THE INVENTION

The improved shelf bracket of the present invention comprises a generally "L"-shaped connection member consisting of a right angle body and arranged for interlocking mating relationship with a second like connection member. Thus, the devices may be mounted in place in an assembly which includes interconnections in either a criss-cross pattern or in a "T", inverted "T", or "L" configuration. The individual connection members comprise an "L"-shaped right angular body member with a pair of legs extending from an apex, and with each leg having planar faces, and with each face having a substantially continuous flanged surface extending from the inner edge to form the body member. In other words, the "L"-shaped member includes a common apex with first and second legs extending at right angles from the apex.

In order to provide for the interlocking mating relationship, one of the flanged surface members is provided with an inverted "U"-shaped channel for receiving a complementary form of extension flange forming the flange surface of the other leg. In this fashion, a generally rectangularly shaped opening is formed on the flanged surface and extends inwardly from the outer edge surface. The rectangularly shaped opening is further provided with means for receiving fasteners in the form of conventional nails and/or screws on its outer surface. A similarly and mating shaped interlocking tab or tabular projection is formed on the flanged surface of the second leg and this projection is arranged to be received within the inverted "U"-shaped opening or channel formed in the flanged surface of the first leg. While the projections and openings of a single individual bracket member are not engaged together, one with another, the mating components and pieces are present upon and received from an adjacent or separate member mounted in place in order to make and/or complete the shelving assembly desired. In order to provide additional stability, slots and/or openings arranged at an oblique angle to the axis of each of the legs is provided to receive fasteners therewithin. Because of the angular relationship of these fastener-receiving zones, additional stability is achieved by virtue of the interlocking relationship of these angularly arranged members. As can be appreciated, these angularly arranged fastener-receiving zones are provided on each of the mating surfaces, such as on the outer surface of the "U"-shaped channel, as well as on the flanged tab member or projection received within the "U"-shaped channel. The configuration of the "U"-shaped channel and the mating tab or tabular projection is preferably rectangular.

With this arrangement, a single piece or configuration of a single material of construction may be provided, with the material preferably being plastic. However, a metallic member could be effectively utilized as well. The members are identical and thus interchangeable, and are designed to work with lumber having different standard dimensions, such as two different standard dimensions of, for example, ½-inch and ⅝-inch. The arrangement of the fastener-receiving zones, as well as the angular relationship of these zones, assist in stress distribution incurred upon loading, thus rendering the apparatus more effective for utilization in book shelves, or other arrangements where loads may become substantial during use. The apparatus utilizes conventional fasteners, such as nails or screws, and thus is easily installed and easily changed should it become desirable to change, modify, or otherwise alter a pre-established shelving arrangement.

Therefore, it is a primary object of the present invention to provide an improved interlocking shelf bracket means for joining individual structural members together in right angular relationship one to another while using conventional fasteners, to form an array of individual shelving members in a preselected and desired disposition.

It is a further object of the present invention to provide an improved interlocking shelf bracket means which is conveniently fabricated from a molded plastic part of singular configuration, with metallic components being acceptable as well, and with the shelf bracket means including a single interchangeable member adapted to provide for rigidity and stability and for use in connection with lumber of either two or more different standard dimensions.

It is yet a further object of the present invention to provide an improved interlocking shelf bracket means which is designed to provide for a moderate distribution of load-induced stresses, thereby improving the quality and stability of the assembly when in place.

It is still a further object of the present invention to provide an improved interlocking shelf bracket means for use in creating arrays of shelving, which is designed to utilize conventional fasteners, and which is easily and expeditiously installed.

Other and further objects of the present invention will become apparent to those skilled in the art upon a study of the following specification, appended claims, and accompanying drawings.

IN THE DRAWINGS

FIG. 4 is a top plan view illustrating a bracket member of the present invention;

FIG. 5 is a front elevational view of the shelf bracket means illustrated in FIGS. 1-4 herein;

FIGS. 6, 7, 8 and 9 are left side elevational, right side elevational, bottom plan and rear elevational views respectively of the device illustrated in FIGS. 1-5 herein;

Figure 2:
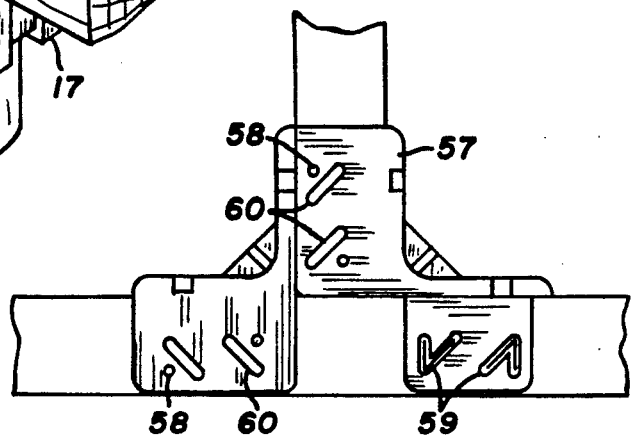
FIG. 2 is a front elevational view of a modified assembly employing the interlocking shelf bracket means of the present invention in an inverted "T" disposition.
Figure 3:
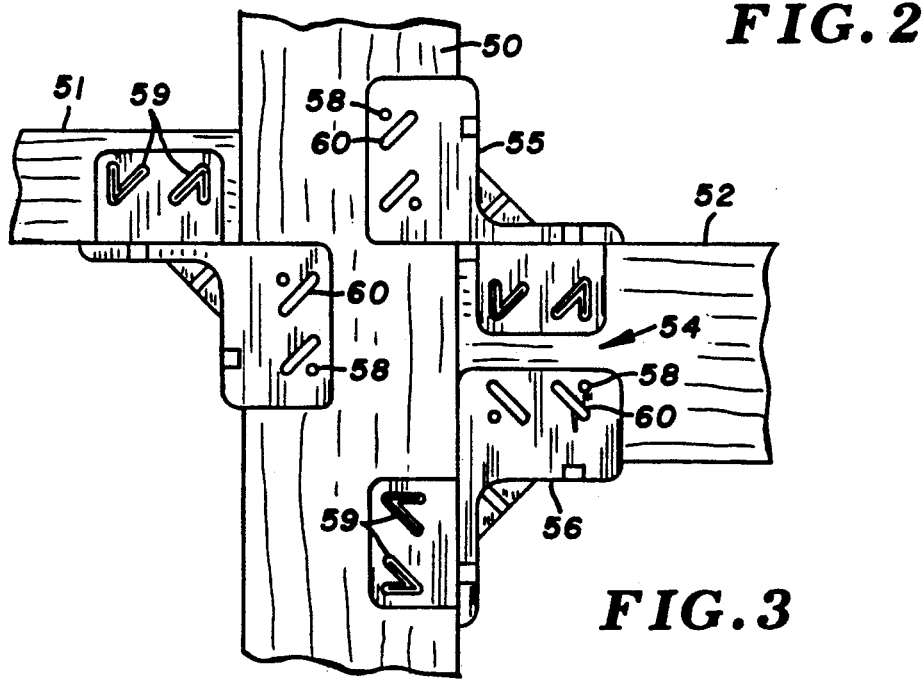
FIG. 3 is a view similar to FIG. 1 and illustrating the arrangement utilizing dimensions other than that utilized in the structure of FIG. 2.
Figure 11:
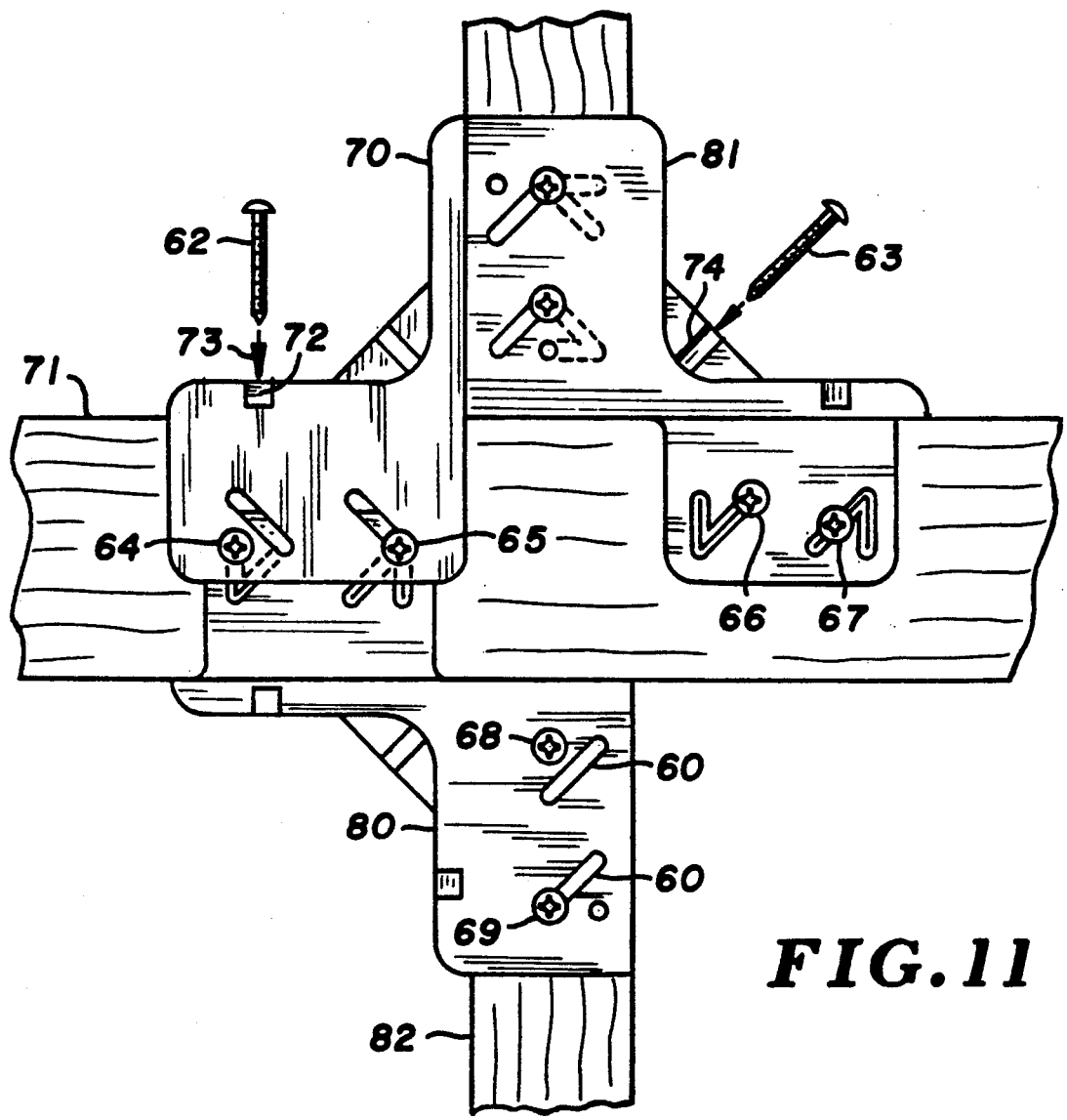

FIG. 10 is a partial fragmentary view, on a slightly enlarged scale, of that portion of the device shown along the lines and in the direction of the arrows 10—10 of FIG. 7; and FIG. 11 is a plan view similar to FIGS. 2 and 3, and illustrating the use of the shelf bracket means of the present invention in combination with conventional dimensioned shelving material of two different dimensional thicknesses.

DESCRIPTION OF THE PREFERRED EMBODIMENT

Figure 1:
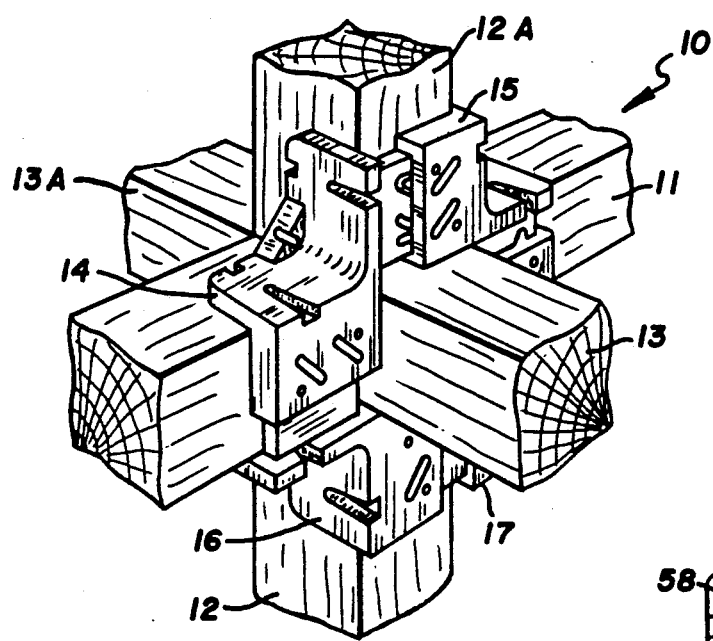
FIG. 1 is a perspective view of a segment of support members for a shelving or similar arrangement, and utilizing an assembly comprising one through-member along with four additional individual pieces of wood or lumber arranged in a cross-connection fashion, and with the arrangement, as illustrated, being utilized in combination with lumber of one standard dimension.

In accordance with the preferred embodiment of the present invention, and with particular attention being directed to FIG. 1 of the drawings, the interlocking shelf bracket means and assembly generally designated 10 includes a dimensioned wooden through-member 11 together with upright segments 12 and 12A secured thereto, along with cross-members (horizontal) 13 and 13A. It will be noted that the through-member 11 is of a cross-sectional dimension which is the same as that of the members 12, 12A, 13 and 13A. In order to create and complete the assembly, the arrangement includes four individual interlocking shelf bracket members 14, 15, 16 and 17, each of which is secured to two individual members of the lumber segments 11, 12, 12A, 13 and 13A, and which are arranged in appropriate interlocking relationship, one to another. In this connection, each of the members 14-17 is designed for mating engagement with its neighbor, such as, for example, with member 14 being engaged with member 15, as illustrated.

The engagement of connection member 14 with its neighbor 15 is undertaken with conventional fasteners, such as the screws illustrated in FIG. 10, as will be discussed hereinafter. In this arrangement, structural member 11 has a cross-sectional dimension which is the same as that of members 12, 12A, 13 and 13A.

With continued attention being directed to FIGS. 1-5 of the drawings, the "L"-shaped connection member of the type illustrated at 14-17 inclusive, consists of an angular body, such as can be seen in FIGS. 4 through 8, with the angular body including a planar face 20 together with a substantially continuous flanged surface 21 extending therefrom. The flanged surface extends from the inner edge 22 so as to form the angle body as illustrated. As is apparent in the views of FIGS. 1-5, and particularly those of FIGS. 2, 3 and 4, the connection member further comprises an apex zone as at 24 from which a first leg 25 and a second leg 26 extend. Legs 25 and 26 are, as indicated at right angles, one to another.

A generally rectangularly configured "U"-shaped opening, generally at 28, is formed on the planar face, with this opening being shown in FIG. 6. This opening extends inwardly from the outer edge surface 29 of the planar face of the first leg 25, with the opening 28 having an inside surface as at 30 with opposed end surfaces 31 and 32 also serving to define the rectangularly shaped opening 28. A generally rectangularly shaped interlocking tabular projection is provided as at 40 for mating engagement within the rectangularly shaped opening 28. This projection extends outwardly from the outer edge portion of planar face 20 as at 41 with projection 40 having an outer surface as at 42 with opposed end surfaces as at 43 and 44 completing the definition of the rectangular projection 40. The extent of mating engagements of tabular projection 40 with the inverted "U"-shaped channel 28 depends upon the cross-sectional thickness of the lumber involved. In the configuration of FIG. 3, conventional lumber or shelving having thicknesses of, for example, ⅝ inch and ¾ inch may be utilized, with the individual lumber segments being illustrated at 50, 51 and 52. The cross-sectional thickness of lumber pieces 50 and 52 is greater than that of lumber piece 51, and thus the inter engagement of the tabular projection or prong 40 is either more limited, or may not occur as is the situation illustrated in the zone 54 between brackets 55 and 56 respectively.

In order to further enhance the stability of the system, a generally equilateral triangular gusset projection as at 57 (FIG. 2) is provided adjacent the apex. The gusset 57 joins together and provides rigidity between legs 25 and 26.

Means are provided along the planar face 20 as well as along the flanged surface 21, the outer surface of channel 28, the surface of tabular projection 40, as well as other selected locations along the body of the bracket to receive and accommodate fasteners for attaching the shelf bracket means to the shelving or other support members. These fastener-receiving means are in the form of bores as at 58—58, or furthermore may be in the form of tapered slots as at 59—59. Tapered slots 59—59 are, as indicated, disposed in the tabular portion 40. With attention being directed to FIG. 10 of the drawings, it will be observed that the individual bores 58—58 and tapered slots 59—59 may not extend entirely through the wall thickness of the bracket device, thereby contributing further to the stability and strength of the bracket means of the present invention when engaged with a fastener.

As indicated, the slots 59—59, as well as the obliquely arranged linear slots 60—60 are disposed along an axis which is oblique to the surface of the bracket. Thus, when interlocked, the combined obliquely arranged slots provide additional rigidity and stability to the overall arrangement when fastened together and loaded in its intended fashion.

With attention now being directed to FIG. 10 of the drawings, it will be seen that the individual brackets are secured in place on the lumber by virtue of screws such as illustrated at 62, 63, 64, 65, 66, 67, 68 and 69. In particular, each of these screws engages the base lumber in a particular fashion. Screw 62, for example, joins bracket 70 to lumber piece 71 through bore 72 along the line and in the direction of arrow 73. Screw 63 engages lumber piece 71 through bore 74. Screws 64-69, in turn, secure members together in a somewhat different fashion. Screws 64 and 65 pass through portions of both brackets 70 and 80, thereby enhancing the stability of the attachment. Screws 66 and 67 are utilized to engage, couple and secure bracket 81 to member 71. Screws 68 and 69 couple bracket 80 to lumber piece or structural member 82.

The overall arrangement of the device is such that the bracket members interlock to form a stable interconnection, and with the interconnection existing between the shelf bracket and the lumber supports and/or shelving. The "U"-shaped channel and the tabular projections have dimensions such that they may be placed in mutually abutting and engaged relationship with each other whenever structural members of either of two (or possibly more than two) commercially common thickness dimension lumber are being employed. In certain other arrangements, there may not necessarily be an interlocking relationship between adjacent bracket members, however adequate stability may still be achieved. In certain instances, it may be desirable to increase the size of the rectangular opening and projection in the event more than two sizes of lumber are intended to be accommodated, however for most purposes, the accommodation of two different sizes has been found to be adequate.

The interlocking shelf bracket means of the present invention may be fabricated from a variety of materials, including molded plastic such as nylon, polyester, epoxy, or the like. Generally, it is preferred that the material be both tough and durable, and capable of being molded.

It will be appreciated that the specific examples given herein are provided for purposes of illustration only and not to be deemed as limitations upon the scope of the invention herein.

What is claimed is:

1. Interlocking shelf bracket means for joining individual structural members together in right angular relationship, one to another to form an array of individual members arranged in preselected isotonic and comprising:

(a) a generally "L"-shaped connection member consisting of an angle body and arranged for interlocking mating relationship with a like connection member and including first and second legs, each leg comprising a planar face having an inner edge surface and an outer edge surface, and with a substantially continuous flanged surface extending from the inner edge surface of said planar face of said first leg to form said angle body member and including a common apex formed at the juncture of said first and second legs, and with said first and second legs extending at right angles from said common apex;

(b) a generally rectangularly configured "U"-shaped channel opening formed on the planar face of said first leg and extending inwardly from the outer edge surface of the flange of said first leg and having an interior surface defining said rectangularly shaped opening and with opposed interior end surfaces further defining said rectangularly shaped opening;

(c) a generally rectangularly shaped interlocking tabular projection for mating engagement within said rectangularly shaped opening and extending outwardly from the outer edge of the said planar face of said second leg and having an exterior surface with opposed edges defining said rectangular shaped tabular projection to mate with and engage the interior surfaces of said rectangularly shaped opening;

(d) means disposed along the surfaces of said fist and second legs for receiving and accommodating fasteners for securing said "L"-shaped connection member to individual structural members for interconnection thereof, with at least one of said fastener-accommodating means in each of said legs being in the form of an elongated slot, and with the slot axis being arranged obliquely to the axis of said first and second legs; and (e) the arrangement being such that said "U"-shaped channel and said tabular projection mesh and interlock to form a stable interconnection between the interior surfaces of said rectangularly shaped opening and the profile of said rectangularly shaped tabular projection respectively are in mutually abutting relationship with the structural members to which they are secured.

2. The interlocking shelf bracket means as defined in claim 1 being particularly characterized in that said means for accommodating fasteners include concave circular cavities for receiving nails therein.

3. The interlocking shelf bracket means as defined in claim 1 being particularly characterized in that said means for receiving and accommodating fasteners include tapered slots.

4. The interlocking shelf bracket means as defined in claim 1 being particularly characterized in that a substantially equilateral triangular gusset projection extends from the apex joining together said first and second legs.

5. The interlocking shelf bracket means as defined in claim 1 being particularly characterized in that said shelf bracket is fabricated from molded plastic.

* * * * *

UNITED STATES PATENT AND TRADEMARK OFFICE
CERTIFICATE OF CORRECTION

PATENT NO. : 5,183,232

DATED : February 2, 1993

INVENTOR(S) : John A. Gale

It is certified that error appears in the above-identified patent and that said Letters Patent is hereby corrected as shown below:

Column 5, line 52, "isotonic" should read -- disposition --.

Signed and Sealed this

Twenty-sixth Day of October, 1993

Attest:

BRUCE LEHMAN

Attesting Officer    Commissioner of Patents and Trademarks